United States Patent
Greenfield et al.

(10) Patent No.: US 6,961,378 B1
(45) Date of Patent: Nov. 1, 2005

(54) ON-CHIP DYNAMIC BUFFER LEVEL INDICATORS FOR DIGITAL VIDEO ENCODER

(75) Inventors: James D. Greenfield, Binghamton, NY (US); John M. Kaczmarczyk, Endicott, NY (US); Agnes Y. Ngai, Endwell, NY (US)

(73) Assignee: International Business Machines Corporation, Armonk, NY (US)

( * ) Notice: Subject to any disclaimer, the term of this patent is extended or adjusted under 35 U.S.C. 154(b) by 689 days.

(21) Appl. No.: 09/186,584

(22) Filed: Nov. 5, 1998

(51) Int. Cl.$^7$ .............................................. H04N 7/32
(52) U.S. Cl. ............................................... 375/240.16
(58) Field of Search ............. 375/240, 240.02–240.07, 375/240.12–240.16, 240.18, 240.2, 240.22; 382/232, 236, 238, 248, 250, 251; 710/52, 710/57; H04N 7/32

(56) References Cited

U.S. PATENT DOCUMENTS

| | | | |
|---|---|---|---|
| 5,038,209 A | 8/1991 | Hang | 358/136 |
| 5,566,208 A | 10/1996 | Balakrishnan | 375/240 |
| 5,654,760 A | 8/1997 | Ohtsuki | 348/405 |
| 5,760,836 A | 6/1998 | Greenfield et al. | 348/419 |
| 5,768,537 A * | 6/1998 | Butter et al. | 375/240.15 |
| 6,072,830 A * | 6/2000 | Proctor et al. | 375/240.22 |
| 6,081,622 A * | 6/2000 | Carr et al. | 375/240.16 |
| 6,094,696 A * | 7/2000 | Choe et al. | 710/52 |
| 6,097,757 A * | 8/2000 | Boice et al. | 375/240 |
| 6,111,913 A * | 8/2000 | Murdock et al. | 375/240.03 |

\* cited by examiner

*Primary Examiner*—Richard Lee
(74) *Attorney, Agent, or Firm*—William H. Steinberg, Esq.; Kevin P. Radigan, Esq.; Heslin Rothenberg Farley & Mesiti, P.C.

(57) ABSTRACT

Method and encoder for encoding a digital video image stream. The encoding includes spatial compression of still images in the video stream and temporal compression between the still images. The spatial compression is carried out by converting a time domain image of a macroblock to a frequency domain image of the macroblock, taking the discrete cosine transform of the frequency domain image, transforming the discrete cosine transformed macroblock image by a quantization factor, and run length encoding the quantized discrete cosine transformed macroblock image. The temporal compression is carried out by reconstructing the run length encoded, quantized, discrete cosine transformed image of the macroblock, searching for a best match macroblock, and constructing a motion vector between them. This forms a bitstream of run length encoded, quantized, discrete cosine transform macroblocks and of motion vectors. This bitstream is passed to and through an external buffer to a transmission medium. The number encoded bits read by a host from the external buffer is fed back to the encoder for calculation in real time of a dynamic buffer level indicator indicative of the fullness of the external buffer. The encoder may generate a BUFFER_EMPTY flag, BUFFER_ALMOST_FULL flag and/or BUFFER_FULL flag for the host.

25 Claims, 6 Drawing Sheets

ON-CHIP DYNAMIC BUFFER LEVEL INDICATORS FOR DIGITAL VIDEO ENCODER

CROSS-REFERENCE TO RELATED PATENT

This application relates to the following commonly assigned United States Letters Patent:

U.S. Pat. No. 5,760,836, issued Jun. 2, 1998, by Greenfield et al., and entitled "FIFO FEEDBACK AND CONTROL FOR DIGITAL VIDEO ENCODER."

This patent is hereby incorporated herein by reference in its entirety.

TECHNICAL FIELD

This invention relates to digital video encoding, such as MPEG-2 compliant digital video encoding and HDTV compliant encoding. More particularly, the invention relates to monitoring of the encoder output buffer, such as a FIFO buffer, field buffer or cascaded buffers, and providing from the encoder to the host in real time a dynamic buffer level indicator indicative of the fullness of the external buffer.

BACKGROUND OF THE INVENTION

One example of an emerging video compression standard is the Moving Picture Expert's Group ("MPEG") standard. Within the MPEG standard, video compression is defined both within a given picture, i.e., spatial compression, and between pictures, i.e., temporal compression. Video compression within a picture is accomplished by conversion of the digital image from the time domain to the frequency domain by a discrete cosine transform, quantization, variable length coding, and Huffman coding (both collectively referred to as "run length coding"). Video compression between pictures is accomplished via a process referred to as "motion compensation" in which a motion vector is used to describe the translation of a set of picture elements (pels) from one picture to another.

For MPEG-2 video encoding, FIFOs are often used to capture video data which has been compressed to the MPEG-2 standard, that is digital video data that has been spatially and temporally compressed, as by discrete cosine transformation, quantization, variable length coding, Huffman coding, and motion estimation. In many applications, the FIFOs are unloaded "real time" for transmission of full motion video through a transmission medium. In certain applications, reading of data from the FIFOs may be required only after a predetermined amount of data is loaded into the FIFOs. In other MPEG-2 encoding applications, memory devices instead of FIFOs may be used to capture compressed video data. Some of these devices, such as field memories, do not provide any memory flags which would be useful in reading the memory device when the device is empty or in notifying a host of the memory status.

DISCLOSURE OF THE INVENTION

This invention monitors the fullness of the external buffer and provides in real time a dynamic buffer level indicator indicative of the fullness of the external buffer. The buffer fullness may be represented by one or more of a BUFFER_EMPTY flag, BUFFER_ALMOST_FULL flag and BUFFER_FULL flag. The fullness of the external buffer can be significant for a number of reasons. For example, a host system may require that fullness of an external buffer reach a predefined threshold before reading data from the buffer. Further, the bitrate of a compressed digital video data stream, such as an MPEG-2 compliant data stream or HDTV compliant data stream, can be adjusted by varying the amount of quantization for the frequency coefficients in a macroblock after the discrete cosine transformation (DCT). The expedient wherein the quantization factor or stepsize is controlled solely as a function of the "fullness" of the external buffer is described in the MPEG-2 standard documentation. The scaling factor by which this is performed uniformly over a macroblock is referred to as a quantization factor or "stepsize". Therefore, by using a large stepsize more compression will result which reduces the compressed stream bitrate but also reduces picture quality. A small stepsize increases the bitrate and picture quality.

According to the present invention, a method and encoder apparatus are provided for encoding a digital video image stream. The encoding includes spatial compression of still images in the digital video image stream and temporal compression between the still images. The spatial compression is carried out by converting a time domain image of a macroblock to a frequency domain image of the macroblock, taking the discrete cosine transform of the frequency domain image, transforming the discrete cosine transformed macroblock image by a quantization factor, and run length encoding the quantized discrete cosine transformed macroblock image. The temporal compression is carried out by reconstructing the run length encoded, quantized, discrete cosine transformed image of the macroblock, searching for a best match macroblock, and constructing a motion vector between them. This forms a bitstream for run length encoded, quantized, discrete cosine transformed macroblocks and of motion vectors. This bitstream is passed through an external buffer, such as a FIFO, to a transmission medium. The number of run length encoded bits is fed back to the encoder for monitoring of the buffer fullness and providing a host processor with a dynamic buffer level indicator in real time indicative of the fullness of the external buffer. The indicator from the encoder to the host system may include one or more of a BUFFER_EMPTY flag, BUFFER_ALMOST_FULL flag and BUFFER_FULL flag.

Advantageously, the method and encoder apparatus of the present invention provides a dynamic buffer level indicator to assist the host application and the control of reading compressed data from the external buffer coupled to the encoder. This buffer level indicator is dynamic in that the indicator is adjusted based on continuous real-time monitoring of the fullness of the external buffer. In one aspect, a BUFFER_EMPTY flag, a BUFFER_ALMOST_FULL flag, and a BUFFER_FULL flag are provided to assist the host application in controlling reading of compressed data from the encoder. This can be significant with field memories or cascaded FIFOs or other memory devices.

BRIEF DESCRIPTION OF THE DRAWINGS

The above-described objects, advantages and features of the present invention, as well as others, will be more readily understood from the following detailed description of certain preferred embodiments of the invention, when considered in conjunction with the accompanying drawings in which.

BEST MODE FOR CARRYING OUT THE INVENTION

The invention relates to MPEG-2 and HDTV compliant encoders and encoding processes. The encoding functions performed by the encoder include data input, motion estimation, macroblock mode generation, data reconstruction, entropy coding, and data output. Motion estimation and compensation are the temporal compression functions. They are repetitive functions with high computational requirements, and they include intensive reconstructive processing such as inverse discrete cosine transformation, inverse quantization, and motion compensation.

Motion compensation exploits temporal redundancy by dividing the current picture into blocks, for example, macroblocks, and then searching in previously transmitted pictures for a nearby block with similar content. Only the difference between the current block pels and the predicted block pels extracted from the reference picture is actually compressed for transmission and thereafter transmitted.

The simplest method of motion compensation and prediction is to record the luminance and chrominance, i.e., intensity and color of every pixel in an "I" picture, then record changes of luminance and chrominance, i.e., intensity and color for every specific pixel in the subsequent picture. However, this is uneconomical in transmission medium bandwidth, memory, processor capacity, and processing time because objects move between pictures, that is, pixel contents move from one location in one picture to a different location in a subsequent picture. A more advanced idea is to use a previous picture to predict where a block of pixels will be in a subsequent picture or pictures, for example, with motion vectors, and to write the result as "predicted pictures" or "P" pictures. More particularly, this involves making a best estimate or prediction of where the pixels or macroblocks of pixels of the $i+1^{th}$ picture will be in the $i^{th}$ picture. It is one step further to use both subsequent and previous pictures to predict where a block of pixels will be in an intermediate or "B" picture.

To be noted is that the picture encoding order and the picture transmission order do not necessarily match the picture display order. See FIG. 2. For I-P-B systems the input picture transmission order is different from the encoding order and the input pictures must be temporarily stored until used for encoding. A buffer stores this input until it is used.

Figure 1:
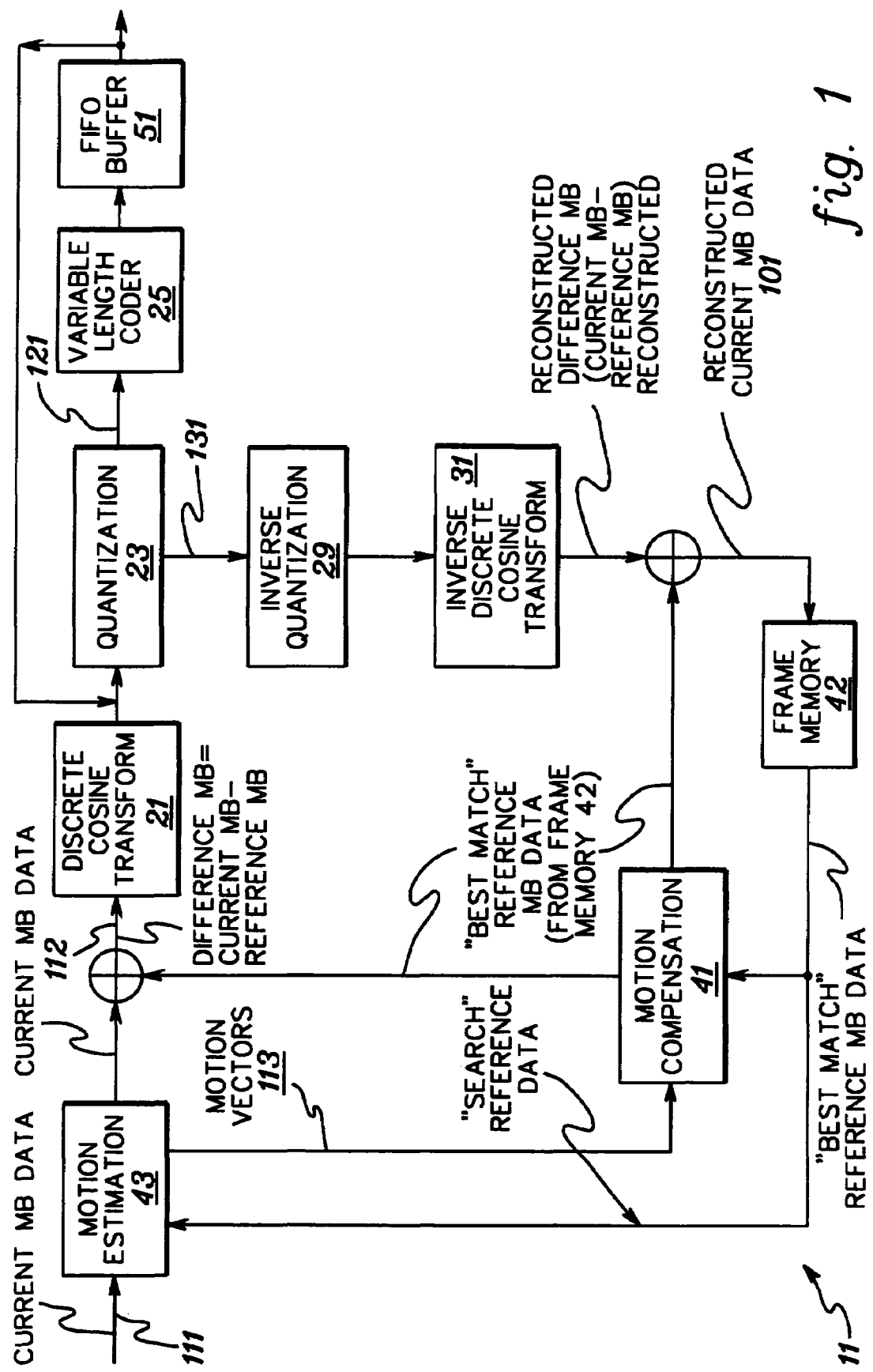
FIG. 1 shows a flow diagram of a generalized MPEG-2 compliant encoder 11, including a discrete cosine transformer 21, a quantizer 23, a variable length coder 25, an outlet FIFO buffer 51 with feedback back to the quantizer 23, an inverse quantizer 29, and inverse discrete cosine transformer 31, motion compensation 41, frame memory 42, and motion estimation 43. The data paths include the picture input 111, difference data 112, motion vectors 113, the picture output 121, the feedback picture for motion estimation and compensation 131, and the motion compensated picture 101. This figure has the assumptions that the $i^{th}$ picture exists in frame memory or frame store 42, and the $i+1^{th}$ picture is being encoded with motion estimation.

For purposes of illustration, a generalized flow chart of MPEG compliant encoding is shown in FIG. 1. In the flow chart the images of the $i^{th}$ picture and the $i+1^{th}$ picture are processed to generate motion vectors. The motion vectors predict where a macroblock of pixels will be in a prior and/or subsequent picture. The use of the motion vectors instead of full images is a key aspect of temporal compression in the MPEG and HDTV standards. As shown in FIG. 1 the motion vectors, once generated, are used for the translation of the macroblocks of pixels from the $i^{th}$ picture to the $i+1^{th}$ picture.

As shown in FIG. 1, in the encoding process, the images of the $i^{th}$ picture and the $i+1^{th}$ picture are processed in the encoder 11 to generate motion vectors which are the form in which, for example, the $i+1^{th}$ and subsequent pictures are encoded and transmitted. An input image of a subsequent picture goes to the Motion Estimation unit 43 of the encoder. Motion vectors 113 are formed as the output of the Motion Estimation unit 43. These vectors are used by the Motion Compensation Unit 41 to retrieve macroblock data from previous and/or future pictures, referred to as "reference" data, for output by this unit. One output of the Motion Compensation Unit 41 is negatively summed with the output from the Motion Estimation unit 43 and goes to the input of the Discrete Cosine Transformer 21. The output of the Discrete Cosine Transformer 21 is quantized in a Quantizer 23. The output of the Quantizer 23 is split into two outputs, 121 and 131; one output 121 goes to a downstream element 25 for further compression and processing before transmission, such as to a run length encoder; the other output 131 goes through reconstruction of the encoded macroblock of pixels for storage in Frame Memory 42. In the encoder shown for purposes of illustration, this second output 131 goes through an inverse quantization 29 and an inverse discrete cosine transform 31 to return a lossy version of the difference macroblock. This data is summed with the output of the Motion Compensation unit 41 and returns a lossy version of the original picture to the Frame Memory 42.

Figure 2:
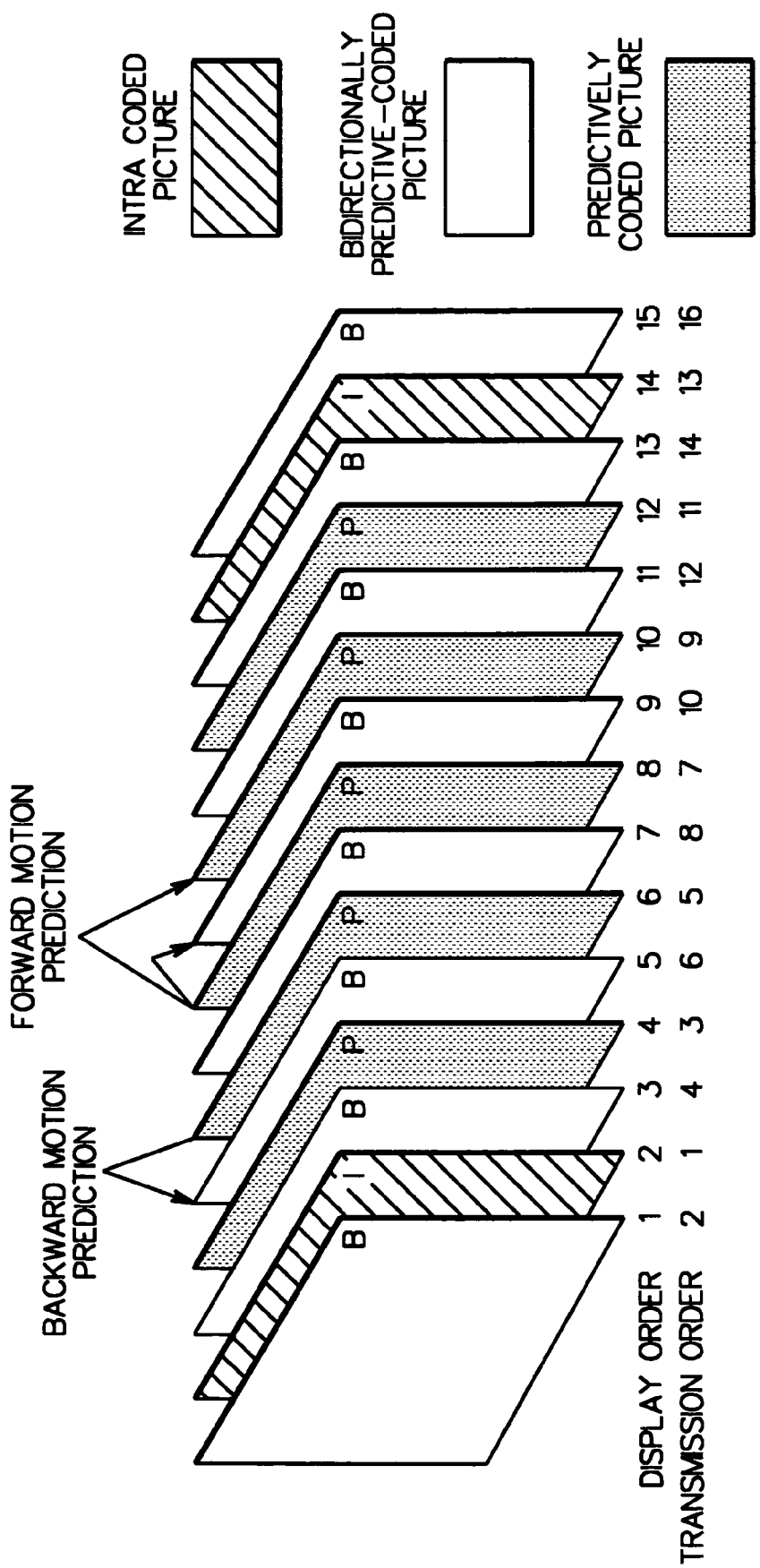
FIG. 2 illustrates the I, P, and B pictures, examples of their display and transmission orders, and forward, and backward motion prediction.

As shown in FIG. 2, there are three types of pictures. There are "Intra pictures" or "I" pictures which are encoded and transmitted whole, and do not require motion vectors to be defined. These "I" pictures serve as a source of motion vectors. There are "Predicted pictures" or "P" pictures which are formed by motion vectors from a previous picture and can serve as a source of motion vectors for further pictures. Finally, there are "Bidirectional pictures" or "B" pictures which are formed by motion vectors from two other pictures, one past and one future, and can not serve as a source of motion vectors. Motion vectors are generated from "I" and "P" pictures and are used to form "P" and "B" pictures.

Figure 3:
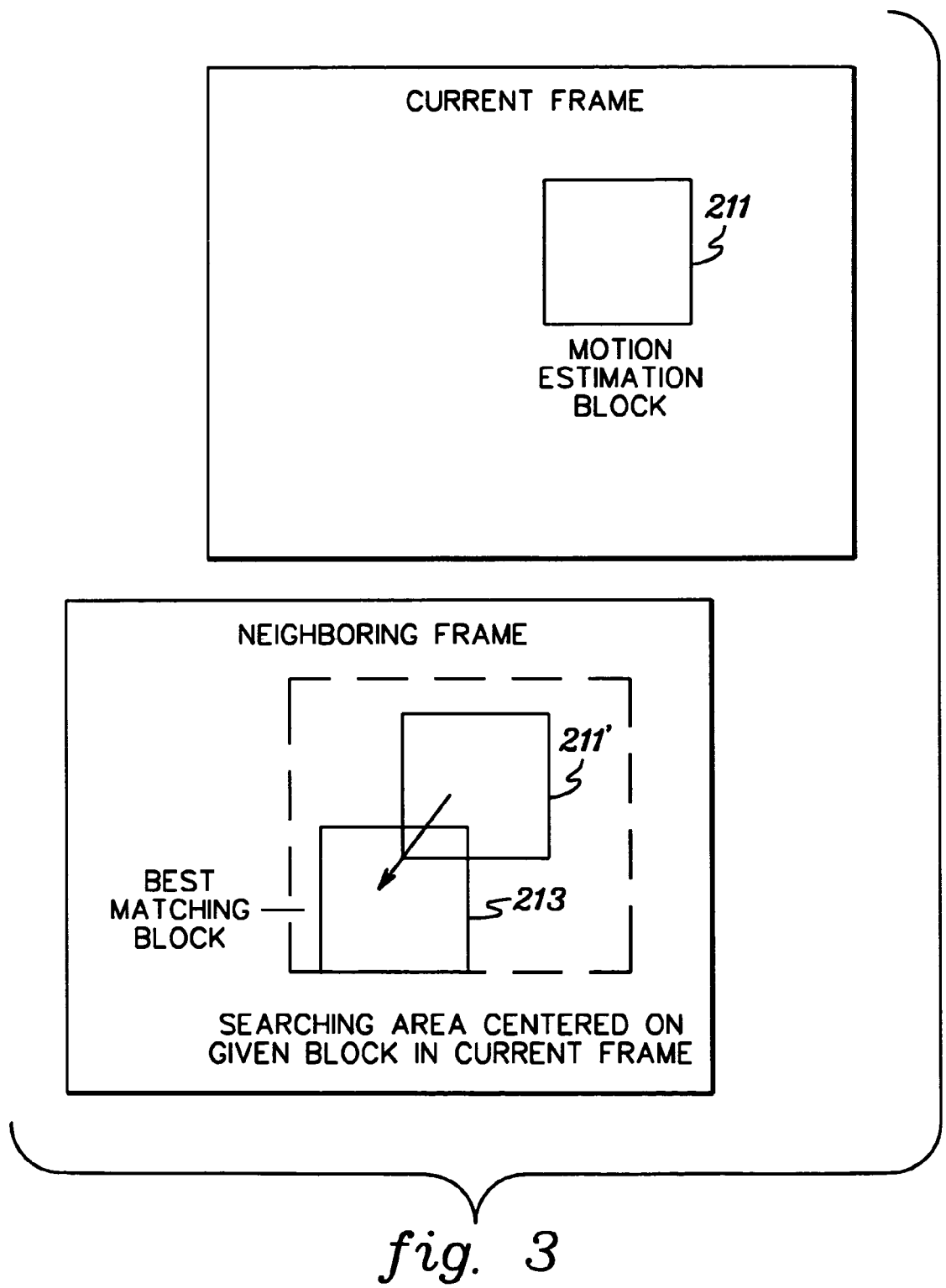
FIG. 3 illustrates the search from the motion estimation block in the current frame or picture to the best matching block in a subsequent or previous frame or picture. Elements 211 and 211' represent the same location in both pictures.
Figure 4:
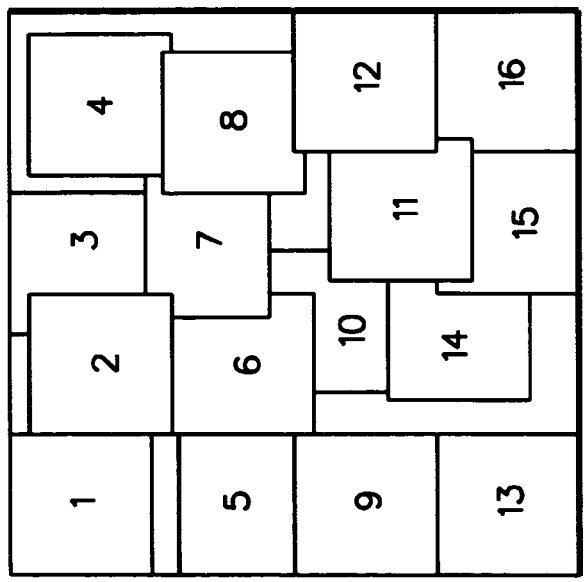
FIG. 4 illustrates the movement of blocks in accordance with the motion vectors from their position in a previous picture to a new picture, and the previous picture's blocks adjusted after using motion vectors.

One method by which motion estimation is carried out, shown in FIG. 3, is by a search from a macroblock 211 of an $i+1^{th}$ picture throughout a region of the previous picture to find the best match macroblock 213 (211' is the same location as 211 but in the previous picture). Translating the macroblocks in this way yields a pattern of macroblocks for the $i+1^{th}$ picture as shown in FIG. 4. In this way, the $i^{th}$ picture is changed a small amount, e.g., by motion vectors and difference data to generate the $i+1^{th}$ picture. What is encoded are the motion vectors and difference data and not the i+1$^{th}$ picture itself. Motion vectors translate position of an image from picture to picture, while difference data carries changes in chrominance, luminance and saturation, that is, changes in color and brightener.

Returning to FIG. 3, we look for a good match by starting from the same location in the i$^{th}$ picture 211' as in the i+1$^{th}$ picture. A search window is created in the i$^{th}$ picture. We search for a best match within this search window. Once found, the best match motion vectors for the macroblock are coded. The coding of the best match macroblock includes a motion vector, that is, how many pixels in the y direction and how many pixels in the x direction is the best match displaced in the next picture. Also encoded is difference data, referred to as the "prediction error", which is the difference in chrominance and luminance between the current macroblock and the best match reference macroblock.

Even with spatial and temporal compression, the bitrate of the compressed digital video data stream is still very high. The bitrate of a compressed digital video data stream, as an MPEG-2 compliant data stream or an HDTV compliant data stream, can be adjusted by varying the amount of quantization for the frequency coefficients in a macroblock after the discrete cosine transformation (DCT). The scaling factor or quantization factor by which this is performed uniformly over a macroblock is referred to as "stepsize". Therefore, by using a large stepsize more compression will result which reduces the compressed stream bitrate but also reduces picture quality. Conversely, a small stepsize increases the bitrate and picture quality.

The stepsize adjustment can be based on many other encoding parameters besides and/or in addition to the measured output FIFO buffer fullness. One such factor in the calculation of stepsize or quantization factor is the difference between the allocated bit budget and the actual number of bits previously used to encode the bitstream. The number of bits used to encode the bitstream (E) is provided as feedback to a processor performing the stepsize calculation used for quantization. The bitrate feedback is provided from a Variable Length Encoder (VLE) and Header Generation Unit (HDU) which are used to assemble the MPEG-2 bitstream.

Another factor which can be used to adjust the stepsize is the fullness of the external buffer, which in real time encoding systems is typically an external FIFO device. By monitoring the amount of data read (R) from the FIFOs and data used to encode the bitstream (E) the bitrate can be adjusted to prevent overflow of the external buffers 51 (FIG. 1) in a normal operating environment.

To accomplish this, a read line (FIFO_RD) from the FIFOs is provided, for example, to a special pin on the video encoder module. Each time that the FIFOs are read an on-chip counter is incremented. A FIFO configuration register is also provided containing information about the external FIFO configuration. The width (w) of the FIFO configuration is set in this register to 1, 2, 4, 8 or more bytes depending upon the application. The depth (d) of the external FIFO (in units of 1 k) is also provided in the configuration register. Using the read count (c) in the on-chip counter and FIFO width the number of bits read by the host (R) can be calculated:

$$R=(c \cdot w) \cdot 8$$

where

R=number of bits read by the host,
c=read count in the on-chip counter, and
w=width of the memory.

Both the counter and the FIFO configuration register can be read in one embodiment using microcode. The microcode can then perform the R calculation.

In parallel, microcode can also monitor the number of bits encoded (E) and then subtract the amount of data read by the host (R). The result of this calculation (E−R) will determine the fullness of the external buffer (BF):

$$BF = E-R$$

Based on the depth (d) of the FIFO and system characteristics, an experimental limit (L) can be calculated and used to determine the point at which the bitrate should be adjusted to avoid buffer overrun. If BF>L then the stepsize will be increased allowing less bits for encoding. This will be monitored until the bitrate is adjusted such that BF<L. If an overrun does occur, a FIFO reset signal called FIFO_RST can be pulsed low to reset the external FIFOs. A FIFO reset is issued at the start of the next encoding picture and the FIFO writing process can then be restarted. The FIFO_RST signal is controlled with microcode and is set when microcode detects the overrun condition:

$$BF > (d \cdot 1024) \cdot (w \cdot 8).$$

The amount of time that bitrate is adjusted can be changed using microcode depending upon the application. For the best adjustment, this should be monitored every macroblock but this requires more calculations for every macroblock. However, because of code flexibility, this can be reduced to multiple macroblocks or slices if required. A reset on read function for the FIFO counter can also be provided so that code does not have to reset the counter after every read. This reduces the amount of instructions needed to monitor the external buffer fullness.

Using the existing structure, this invention can also be modified to provide an indication to the host that the FIFO buffer has enough data present to begin reading. This is useful for applications where a block read of data to the host is required. A FIFO threshold register which contains the number of bytes required to be stored in the FIFO prior to a read by the application is set through the host interface. The microcode can then read this register and compare it with the buffer fullness in bytes. If buffer fullness is greater than the number of bytes in the FIFO threshold register, then a signal called FIFO_BUFL (FIFO Buffer Level) will be pulsed high indicating that the FIFO is ready to be read by the host.

One disadvantage of the above-summarized processing is that it is implemented in microcode, and therefore, buffer fullness is not constantly monitored. Without a real time view of the fullness of the buffer, the host processor must wait until the microcode goes in, polls the on-chip register and calculates the fullness of the FIFO. This creates a latency issue which produces an inherent inaccuracy in the FIFO fullness reading. This invention provides a solution by implementing FIFO monitoring and a dynamic FIFO buffer level indicator in hardware inside the digital video encoder for interfacing, for example, to the industry standard FIFO buffer or cascaded FIFO buffers. In addition, this logic circuitry is programmable for various FIFO configurations. By implementing the invention in hardware, a real time buffer fullness level indication is possible.

In other MPEG-2 encoding applications, memory devices instead of FIFOs are used to capture compressed video data. Some of these devices, such as field memories, do not provide EMPTY, ALMOST_FULL, and FULL flags, which may be standard on other memory types. Further, if the external memory comprises cascaded FIFOs, then any flags on the FIFOs themselves are unusable due to the cascaded architecture. The EMPTY, ALMOST_FULL, and FULL flags are useful to avoid reading the memory devices when they are empty, and to notify the host when the buffer is full or almost full. In accordance with the present invention, the flags are generated in real time on-chip, for example, using hardware logic to monitor the fullness of the external memory buffer and to signal to the host controller when the buffer is empty, almost full or full. In addition, this logic circuitry is also preferably programmable for various memory configurations.

Figure 5:
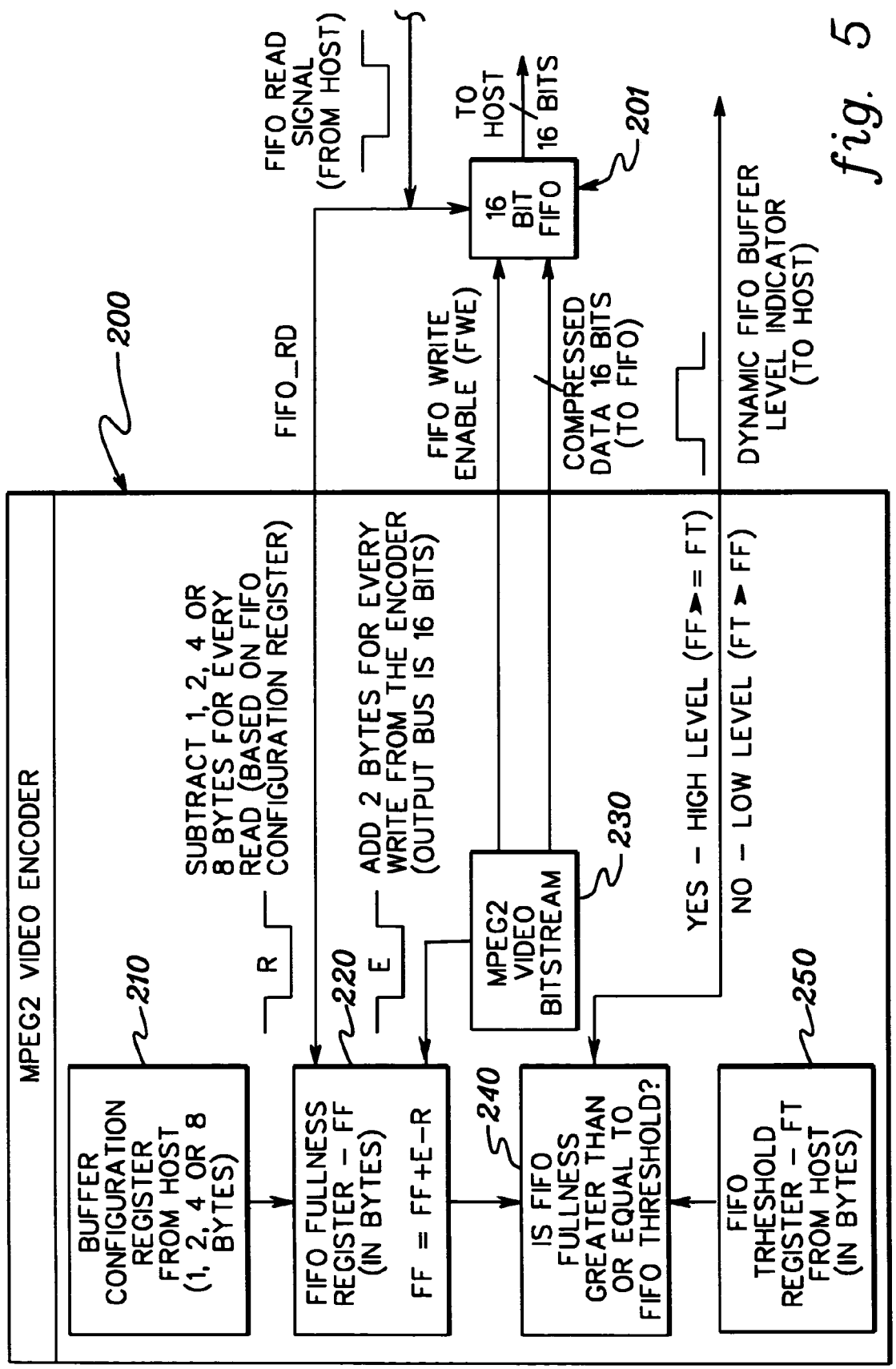
FIG. 5 shows one embodiment of encoder logic comprising a FIFO buffer monitoring and indicator system in accordance with the present invention.

One embodiment of encoder logic in accordance with this invention, adapted to monitor fullness of an external FIFO buffer, is presented in FIG. 5. As shown, an MPEG-2 video encoder 200 provides a compressed data bitstream to an external FIFO buffer 201. A host processor (not shown) reads 16 bits of data from the external FIFO buffer with each FIFO read signal (FIFO_RD) from the host. The MPEG-2 video bitstream is provided to the FIFO 201 at the rate of 16 bits per write enable signal (FWE). By monitoring the write signal (FWE) to the external FIFO buffer, the number of encoded bytes (E) written to the external buffer can be counted. In addition, by monitoring the FIFO read line (FIFO_RD), the number of bytes read by the host (R) can be readily determined, e.g., at a FIFO fullness register 220.

Note that the example shown in FIG. 5 is for a 2-byte (16 bit) configuration for both the read and write. However, if for example the external FIFO buffer were designed for another data width, then the FIFO buffer configuration register 210 could be programmed to this different configuration. By way of example, FIFO buffer reads of 1, 2, 4 or 8 bytes may be employed. The width of the compressed data bus, which determines the number of encoded bytes (E), is based on the design of the encoder 200.

In order to determine the fullness of the FIFO buffer, the FIFO fullness register (FF) 220 is continuously updated to dynamically reflect the fullness of the FIFO buffers. This is done by updating the FIFO fullness register 220 per the following equation every cycle:

$$FF=FF+E-R$$

For instance, if there is a read (R) of the FIFO, then FF will be decremented based on the FIFO output width. A write to the FIFO (E) will cause FF to be incremented by the encoder output width. If both a write (E) and read (R) happen in the same cycle, then FF will be changed by the factor E−R. In the example shown, both E and R equal two bytes so if both a read and write occur in the same cycle, then the fullness register remains unchanged.

The FIFO fullness register is used to generate a real time FIFO buffer level indicator which is provided to the host. The FIFO buffer level indicator is dynamically changed by comparing at logic 240 the value of the FIFO fullness register (FF) versus a valued stored in the FIFO threshold register (FT). While FT>FF, a 0 signal is sent to the host indicating that the FIFOs are not filled to the desired level. However, if FF≧FT, then a high-level signal is sent to the host indicating that the FIFOs have reached and/or exceeded the threshold. The host provides the FIFO buffer threshold (FT) to FIFO threshold register 250 and may program a different threshold (FT) for different applications.

As an additional feature, the encoder logic is preferably provided with error correction in accordance with the present invention to avoid error conditions. For example, if there is a FIFO read when the FF register is 0, then the read is preferably ignored and the FF register is not decremented. In addition, if the FF register is at the maximum value, and it receives another write then the write will be ignored and the FF register will not be incremented. Both of these error conditions are noted to avoid wrapping in the FF register. The size of the FF register should be made large enough to avoid this condition.

Figure 6:
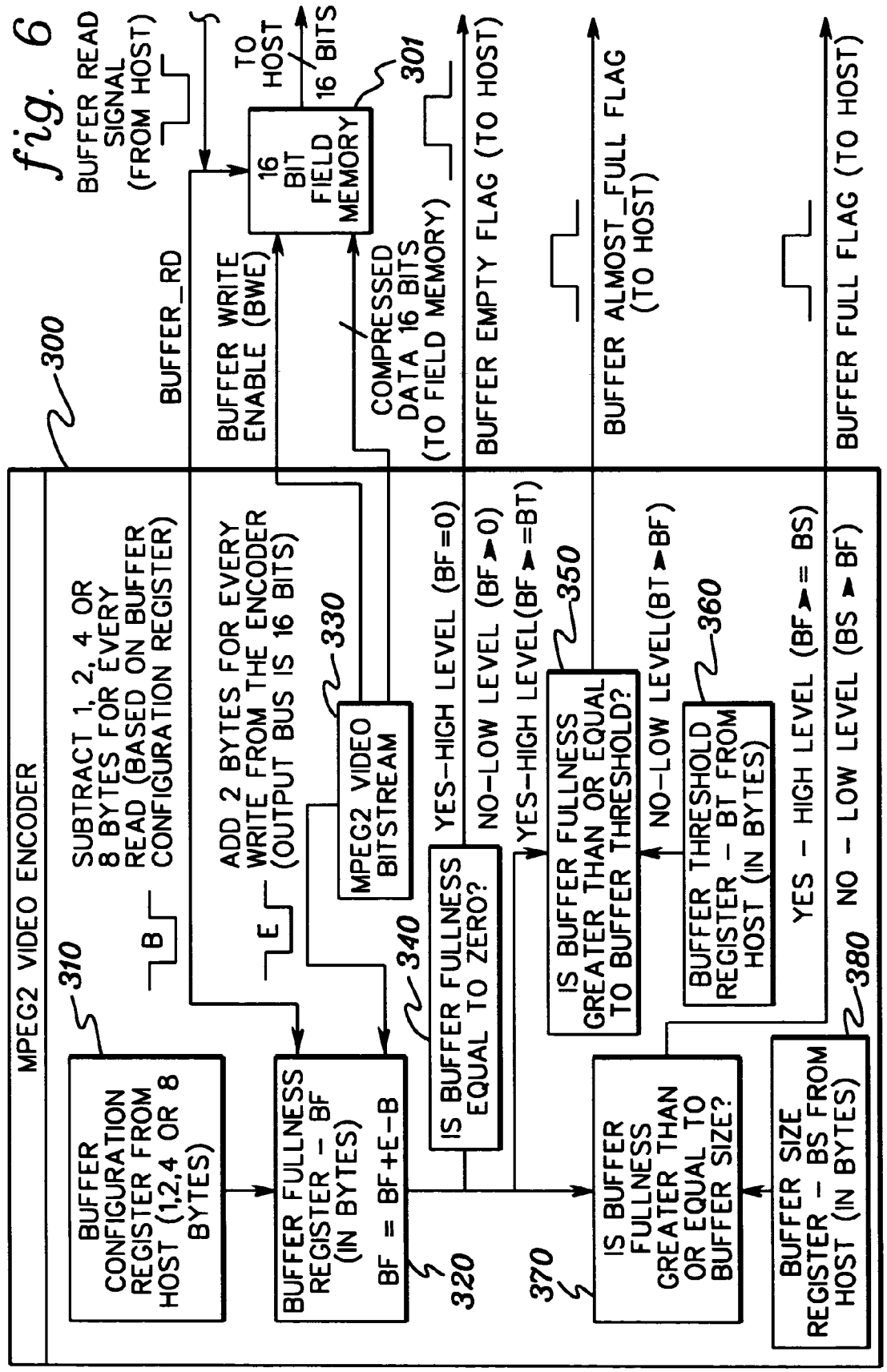
FIG. 6 depicts an alternate embodiment of encoder logic comprising a field buffer monitoring and indicator system in accordance with the present invention.

In another aspect, this invention comprises providing logic on the encoder to generate BUFFER_EMPTY, BUFFER_ALMOST_FULL, and BUFFER_FULL flags for non-FIFO memory devices, such as field memory, or for cascaded FIFO devices. A functional overview of this logic is depicted in FIG. 6, wherein an MPEG-2 video encoder 300 again feeds compressed data in 16-bit format to an external buffer 301, which in this example comprises 16 bit field memory. The MPEG-2 video bitstream is provided to the external memory buffer 301 at a rate of 16 bits per buffer write enable (BWE).

By monitoring the write signal to the buffer (BWE), the number of encoded bytes (E) written to external memory can be counted. In addition, by monitoring the buffer read line (BUFFER_RD) for a buffer read signal from the host processor, the number of bytes read (B) by the host can be determined. Again, programmability is provided through use of a buffer configuration register 310 for specifying whether the host processor is reading 1, 2, 4 or 8 bytes per read signal. The example shown in FIG. 6 is for a 2-byte (16 bit) configuration for both the read and write operations. However, if the external memory buffer 301 were designed for a different read data width, then the buffer configuration register 310 would be programmed to account for this different width. This allows the logic of FIG. 6 to be used in various applications. The width of the compressed data bus, which determines the number of encoded bytes (E) is based on the design of the encoder. The number of encoded bytes (E) is provided by the MPEG-2 video bitstream 330 to a buffer fullness register (BF) 320, along with the number of bytes read (B) by the host.

In order to determine the fullness of the buffer, the buffer fullness register (BF) 320 is constantly updated to reflect the fullness of the memory buffer on a dynamic basis. This is done by updating the buffer fullness register per the following equation every cycle:

$$BF=BF+E-B.$$

Therefore, if there is a read (B) of the buffer, BF will be decremented based on the buffer output width. A write to the external buffer (E) will cause BF to be incremented by the encoder output width. If both a write (E) and read (B) happen in the same cycle, then the buffer fullness (BF) will be changed by the factor E−B. In the example shown, the number of written bytes (E) and number of read bytes (B) both equal 2 bytes so that if both a read and write occur in the same cycle, the fullness of the register is unchanged.

A BUFFER_EMPTY flag is dynamically provided by comparing the value of the buffer fullness register 320 to 0 in logic 340. If the buffer fullness is equal to 0, then the BUFFER_EMPTY flag to the host is set high, indicating that the memory buffer is empty. When BF>0, the BUFFER_EMPTY flag is low.

A BUFFER_ALMOST_FULL flag is dynamically set by logic 350, which compares the value of the buffer fullness register 320 versus a value in a buffer threshold register (BT) 360. The buffer threshold register contains the threshold value in bytes provided by the host processor. If BF≧BT, then the BUFFER_ALMOST_FULL flag is set high, indicating, for example, that the memory buffer is almost full. The threshold for the almost full condition can be changed by reprogramming the buffer threshold register 360 through the host. If BT>BF, the BUFFER_ALMOST_FULL flag is low.

A BUFFER_FULL flag is dynamically changed by logic 370 by comparing the value of the buffer fullness register 320 versus the buffer size register (BS) 380. If BF≧BS, then the BUFFER_FULL flag is set high, indicating to the host that the memory buffer is full. Again, the size of the buffer can be changed for different applications by reprogramming the buffer size register 380 through the host. If BS>BF, then the BUFFER_FULL flag is low.

In addition to the above aspects of the logic of FIG. 6, error correction is preferably provided in accordance with the present invention to avoid certain error conditions. For example, if there is a buffer read when the buffer fullness (BF) register is 0, then the read is preferably ignored and the BF register is not decremented. In addition, if the buffer fullness register 320 is at a maximum value, and it receives another write signal, then the write signal is preferably ignored and the BF register will not be incremented. Both of these error conditions are preferably provided to avoid wrapping in the buffer fullness register. Note that the size of the buffer fullness register should be made large enough to avoid this condition.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

What is claimed is:

1. In a method of encoding a digital video image stream in an encoder, comprising spatial compression of still images in the digital video image stream and temporal compression between the still images, wherein the spatial compression is carried out by converting a time domain image of a macroblock to a frequency domain image of the macroblock, taking a discrete cosine transform of the frequency domain image, transforming the discrete cosine transformed macroblock image by a quantization factor, and run length encoding the quantized discrete cosine transformed macroblock image, wherein the temporal compression is carried out by reconstructing the quantized, discrete cosine transformed image of the macroblock, searching for a best match macroblock, and constructing a motion vector therebetween, to thereby form a bitstream comprising run length encoded, quantized, discrete cosine transformed macroblocks and motion vectors, and passing the bitstream to and through an external buffer to a transmission medium, the improvement comprising feeding back to hardware logic within the encoder an external read signal from a host and incrementing an on-chip counter of the hardware logic each time that the external buffer is read and calculating therefrom the number of bits read by a host (R), and determining the number of bits encoded and written into an external buffer (E), and in the hardware logic of the encoder subtracting from a number of bits encoded (E) the number of bits read by the host (R) to continuously obtain the fullness of an external buffer (BF), and providing, from the hardware logic within the encoder to the host, in real time a dynamically updated flag comprising at least one of a BUFFER_EMPTY flag, a BUFFER_ALMOST_FULL flag and a BUFFER_FULL flag.

2. The method of claim 1, wherein said providing the host in real time with said dynamically updated flag comprises providing the host in real time with at least said BUFFER_EMPTY flag, said providing of said BUFFER_EMPTY flag comprising continuously determining whether said fullness of the external buffer (BF) is equal to 0, and providing a high-level indicator when a buffer fullness (BF) is 0, and a low-level indicator when the buffer fullness is greater than 0.

3. The method of claim 1, wherein said providing the host in real time with said dynamically updated flag comprises providing the host with at least said BUFFER_ALMOST_FULL flag, said providing of said BUFFER_ALMOST_FULL flag comprising continuously determining whether the fullness of the external buffer (BF) is greater than or equal to a buffer threshold (BT), and providing said host with a high-level indicator when a buffer fullness (BF) is greater than or equal to said buffer threshold (BT), and a low-level indicator when the buffer threshold (BT) is greater than the buffer fullness (BF).

4. The method of claim 3, further comprising providing an on-chip buffer threshold register, said on-chip buffer threshold register containing a host defined buffer threshold value for use in comparing of said buffer fullness (BF) to said buffer threshold (BT).

5. The method of claim 1, wherein said providing the host in real time with said dynamically updated flag comprises providing the host in real time with at least said BUFFER_FULL flag, said providing of said BUFFER_FULL flag, comprising continuously comparing the fullness of the external buffer (BF) to a predefined buffer size (BS), and providing the host with a high-level indicator when a buffer fullness (BF) is greater than or equal to said buffer size (BS), and a low-level indicator when said buffer size (BS) is greater than said buffer fullness (BF).

6. The method of claim 5, further comprising providing an on-chip buffer size register for holding a host-defined buffer size value for use in said comparing of said buffer fullness (BF) to said buffer size (BS).

7. The method of claim 1, wherein said external buffer comprises one of an external field buffer or external cascaded FIFOs.

8. The method of claim 1, wherein the continuously obtaining comprises obtaining the fullness of the external buffer (BF) every cycle of the encoder.

9. An encoder for encoding a digital video image stream in the encoder, comprising means for spatial compression of still images in the digital video image stream and means for temporal compression between the still images, wherein the means for spatial compression comprises means for converting a time domain image of a macroblock to a frequency domain image of the macroblock, means for taking a discrete cosine transform of the frequency domain image, means for transforming the discrete cosine transformed macroblock image by a quantization factor, and means for run length encoding the quantized discrete cosine transformed macroblock image, wherein the means for temporal compression comprises means for reconstructing the quantized, discrete cosine transformed image of the macroblock, means for searching for a best match macroblock, and means for constructing a motion vector therebetween, said means for encoding a digital video image stream thereby forming a bitstream comprising run length encoded, quantized, discrete cosine transform macroblocks and motion vectors and passing the bitstream to and through an external buffer to a transmission medium, the improvement comprising means for feeding back to hardware logic within the encoder an external read signal from a host, and for incrementing an on-chip counter of the hardware logic each time the external buffer is read and calculating therefrom the number of bits read by a host (R), said hardware logic in the encoder being further adapted to monitor a number of bits encoded (E) and written into the external buffer and subtract from the number of bits encoded (E) the number of bits read by the host (R) to continuously obtain the fullness of an external buffer (BF), and wherein said hardware logic in the encoder is further adapted to provide the host in real time with dynamically updated flags comprising a BUFFER_EMPTY flag, a BUFFER_ALMOST_FULL flag and a BUFFER_FULL flag.

10. The encoder of claim 9, wherein said external buffer comprises one of an external field buffer or external cascaded FIFOs.

11. The encoder of claim 10, wherein said logic adapted to provide said BUFFER_EMPTY flag comprises logic adapted to continuously determine whether said fullness of the external buffer (BF) is equal to 0, and to provide a high-level indicator when a buffer fullness (BF) is 0, and a low-level indicator when the buffer fullness is greater than 0.

12. The encoder of claim 11, wherein said logic adapted to provide said BUFFER_ALMOST_FULL flag comprises logic adapted to continuously determine whether the fullness of the external buffer (BF) is greater than or equal to a buffer threshold (BT), and to provide said host with a high-level indicator when the buffer fullness (BF) is greater than or equal to said buffer threshold (BT), and a low-level indicator when the buffer threshold (BT) is greater than the buffer fullness (BF).

13. The encoder of claim 12, wherein said logic adapted to provide said BUFFER_FULL flag comprises logic adapted to continuously compare the fullness of the external buffer (BF) to a predefined buffer size (BS), and to provide the host with a high-level indicator when the buffer fullness (BF) is greater than or equal to said buffer size (BS), and a low-level indicator when said buffer size (BS) is greater than said buffer fullness (BF).

14. The encoder of claim 9, wherein the hardware logic continuously obtains the fullness of the external buffer (BF) every cycle of the encoder.

15. In a method of encoding a digital video image stream in an encoder, comprising spatial compression of still images in the digital video image stream and temporal compression between the still images, wherein the spatial compression is carried out by converting a time domain image of a macroblock to a frequency domain image of the macroblock, taking a discrete cosine transform of the frequency domain image, transforming the discrete cosine transformed macroblock image by a quantization factor, and run length encoding the quantized discrete cosine transformed macroblock image, wherein the temporal compression is carried out by reconstructing the quantized, discrete cosine transformed image of the macroblock, searching for a best match macroblock, and constructing a motion vector therebetween, to thereby form a bitstream comprising run length encoded, quantized, discrete cosine transformed macroblocks and motion vectors, and passing the bitstream to and through an external buffer to a transmission medium, the improvement comprising feeding back to hardware logic within the encoder an external buffer read signal from a host and incrementing an on-chip counter of the hardware logic each time that the external buffer is read and calculating therefrom the number of bits read by a host (R), and determining the number of bits encoded and written into an external buffer (E), and in the hardware logic of the encoder subtracting from a number of bits encoded (E) the number of bits read by the host (R) to continuously obtain the fullness of an external buffer (BF), and providing, from the hardware logic within the encoder to the host, a dynamic buffer level indicator in real time indicative of the fullness of the external buffer (BF); and wherein the continuously obtaining comprises obtaining the fullness of the external buffer (BF) every cycle of the encoder.

16. The method of claim 15, wherein said external buffer comprises one of a field buffer or cascaded FIFO buffers, and wherein said dynamic buffer level indicator comprises at least one of a BUFFER_EMPTY flag, BUFFER_ALMOST_FULL flag and BUFFER_FULL flag.

17. The method of claim 16, wherein said providing the host in real time with said dynamic buffer level indicator comprises providing the host in real time with multiple dynamically updated flags, said multiple dynamically updated flags comprising the BUFFER_EMPTY flag, BUFFER_ALMOST_FULL flag and BUFFER_FULL flag.

18. An encoder for encoding a digital video image stream in the encoder, comprising means for spatial compression of still images in the digital video image stream and means for temporal compression between the still images, wherein the means for spatial compression comprises means for converting a time domain image of a macroblock to a frequency domain image of the macroblock, means for taking a discrete cosine transform of the frequency domain image, means for transforming the discrete cosine transformed macroblock image by a quantization factor, and means for run length encoding the quantized discrete cosine transformed macroblock image, wherein the means for temporal compression comprises means for reconstructing the quantized, discrete cosine transformed image of the macroblock, means for searching for a best match macroblock, and means for constructing a motion vector therebetween, said encoder for encoding a digital video image stream thereby forming a bitstream comprising run length encoded, quantized, discrete cosine transform macroblocks and motion vectors and passing the bitstream to and through an external buffer to a transmission medium, the improvement comprising means for feeding back to hardware logic within the encoder an external read signal from a host, and for incrementing an on-chip counter of the hardware logic each time that the external buffer is read and calculating therefrom the number of bits read by a host (R), said hardware logic in the encoder being further adapted to monitor a number of bits encoded (E) and written into the external buffer and subtract from the number of bits encoded (E) the number of bits read by the host (R) to continuously obtain the fullness of an external buffer (BF), and wherein said hardware logic in the encoder is further adapted to provide the host with a dynamic buffer level indicator in real time indicative of the fullness of the external buffer (BF); and wherein the hardware logic continuously obtains the fullness of the external buffer (BF) every cycle of the encoder.

19. The encoder of claim 18, wherein said external buffer comprises one of a field buffer or cascaded FIFO buffers, and wherein said dynamic buffer level indicator comprises at least one of a BUFFER_EMPTY flag, BUFFER_ALMOST_FULL flag and BUFFER_FULL flag.

20. The encoder of claim 19, wherein said dynamic buffer level indicator comprises said BUFFER_EMPTY flag, and wherein said logic is further adapted to continuously determine whether said fullness of the external buffer (BF) is equal to 0, and provide a high-level indicator when a buffer fullness (BF) is 0, and a low-level indicator when the buffer fullness is greater than 0.

21. The encoder of claim 19, wherein said dynamic buffer level indicator comprises said BUFFER_ALMOST_FULL flag, and wherein said logic is further adapted to continuously determine whether the fullness of the external buffer (BF) is greater than or equal to a buffer threshold (BT), and to provide said host with a high-level indicator when a buffer fullness (BF) is greater than or equal to said buffer threshold (BT), and a low-level indicator when the buffer threshold (BT) is greater than the buffer fullness (BF).

22. The encoder of claim 21, further comprising an on-chip buffer threshold register, said on-chip buffer threshold register containing a host defined buffer threshold value for use by said logic in comparing said buffer fullness (BF) to said buffer threshold.

23. The encoder of claim 19, wherein said dynamic buffer level indicator comprises said BUFFER_FULL flag, and wherein said logic is adapted to continuously compare the fullness of the external buffer (BF) to a predefined buffer size (BS), and to provide the host with a high-level indicator when a buffer fullness (BF) is greater than or equal to said buffer size (BS), and a low-level indicator when said buffer size (BS) is greater than said buffer fullness (BF).

24. The encoder of claim 23, further comprising an on-chip buffer size register within said encoder for holding a host-defined buffer size value for use by said encoder logic in comparing said buffer fullness (BF) to said buffer size (BS).

25. The encoder of claim 19, wherein said external buffer comprises one of an external field buffer or external cascaded FIFOs.

* * * * *